United States Patent
Misumi et al.

(10) Patent No.: US 7,868,781 B2
(45) Date of Patent: Jan. 11, 2011

(54) ENCODER

(75) Inventors: Takeshi Misumi, Wako (JP); Shinichiro Kobashi, Wako (JP); Yoshiji Takahashi, Natori (JP)

(73) Assignees: Honda Motor Co., Ltd., Tokyo (JP); Nikon Corporation, Tokyo (JP)

( * ) Notice: Subject to any disclaimer, the term of this patent is extended or adjusted under 35 U.S.C. 154(b) by 1203 days.

(21) Appl. No.: 11/492,909

(22) Filed: Jul. 26, 2006

(65) Prior Publication Data

US 2007/0061039 A1    Mar. 15, 2007

(30) Foreign Application Priority Data

Aug. 4, 2005    (JP)    ............... 2005-226163

(51) Int. Cl.
G06F 19/00    (2006.01)
H04L 1/00    (2006.01)

(52) U.S. Cl. ............... 340/870.07; 340/870.01; 340/870.04; 340/870.16; 700/245

(58) Field of Classification Search ............ 340/870.01, 340/870.04, 870.07, 870.16; 700/245
See application file for complete search history.

(56) References Cited

U.S. PATENT DOCUMENTS

| | | | | | |
|---|---|---|---|---|---|
| 4,063,220 | A | * | 12/1977 | Metcalfe et al. | 370/462 |
| 4,302,817 | A | * | 11/1981 | Labedz | 708/312 |
| 4,358,737 | A | * | 11/1982 | Bennett | 327/45 |
| 4,430,975 | A | * | 2/1984 | Ishida et al. | 123/399 |
| 4,897,884 | A | * | 1/1990 | Heller | 398/109 |
| 4,940,964 | A | * | 7/1990 | Dao | 340/438 |
| 5,231,664 | A | * | 7/1993 | Bestler et al. | 380/241 |
| 5,642,024 | A | * | 6/1997 | Okada et al. | 318/625 |
| 7,705,553 | B2 | * | 4/2010 | Worrall | 318/625 |
| 2003/0223374 | A1 | * | 12/2003 | Hayashi | 370/242 |
| 2005/0068194 | A1 | * | 3/2005 | Schleich et al. | 340/870.02 |
| 2007/0013549 | A1 | * | 1/2007 | Schleich et al. | 340/870.02 |
| 2007/0061039 | A1 | * | 3/2007 | Misumi et al. | 700/245 |

FOREIGN PATENT DOCUMENTS

| | | |
|---|---|---|
| JP | 10-206188 | 7/1998 |
| JP | 2004-317261 | 11/2004 |

* cited by examiner

*Primary Examiner*—Brian A Zimmerman
*Assistant Examiner*—Amine Benlagsir
(74) *Attorney, Agent, or Firm*—Squire, Sanders & Dempsey, LLP

(57) ABSTRACT

In an encoder constituted from a detection part (a light-emitting part, rotating disk, and light-receiving part), which detects a signal corresponding to the state of a specimen, and calculates and stores the position information of the specimen from a signal outputted from this detection part, and a signal processing part for transmitting the stored position information to a host machine by way of serial communications, the signal processing part being constituted having: a two-way communication mode M1 for receiving command data from the host machine, and, when this command data is a two-way communication request command (commands A through C), transmitting the requested position information and the like to the host machine; a one-way communication mode M2 for transmitting the position information to the host machine by executing one-way transmission processing S105 when the command data is a one-way communication request command (command P); and a quasi one-way communication mode M3 for transmitting the position information to the host machine by executing quasi one-way transmission processing S107 when the command data is a quasi one-way communication request command (command Q).

5 Claims, 3 Drawing Sheets

ENCODER

FIELD OF THE INVENTION

The present invention relates to an encoder.

BACKGROUND OF THE INVENTION

An encoder measures the angle of rotation and length of movement of a specimen, and is utilized as a sensor in robots and machine tools. The measurement values measured by this encoder (information related to an angle and length, called "encoder data" in the following explanation) are sent to a control device or other such host machine via a communication device, which carries out serial communications by way of a communication line. As forms of serial communications, either one-way communications or two-way communications are used, and in one-way communications, the encoder converts encoder data to serial data, and outputs the data at a certain fixed time cycle. Conversely, in two-way communications, it is common for the constitution to be such that the encoder receives a command signal from the host machine, and sends encoder data corresponding to the contents of this command signal (For example, refer to Japanese Laid-open Patent No. 2004-317261).

When an encoder such as this is used for sampling the state of a specimen, the sampling time during which encoder data can be acquired from the host machine is limited to the encoder data communication time. For example, the communication cycle $T_1$ for one-way communications is determined by the encoder data ED transmission time $T_D$ and wait time $T_W$ as shown in FIG. 3A, and the communication cycle $T_2$ for two-way communications is determined by command data CD transmission time $T_C$, encoder data ED transmission time $T_D$ and wait times $T_{W1}$, $T_{W2}$ as shown in FIG. 3B.

Robot and machine tool operation has been speeded up in recent years, and in line with this, there is a requirement to shorten the state sampling interval of the encoder, thus making it desirable to speed up the serial communications of the communication device used by an encoder.

However, the information that a host machine acquires from an encoder is no longer limited to just the measurements of conventional angles and lengths, and the amount of encoder information, such as status information, temperature information, and memory information, is increasing. For this reason, it is not possible to shorten the sampling interval of one-way communications due to the longer communication time resulting from the increase in the amount of data. Meanwhile, in the case of two-way communications, information outputted from an encoder can be selected in accordance with a request signal (the command data in FIG. 3B) from a host machine, but since the transmission and reception of command data from a host machine, and encoder data from an encoder are carried out within a single communication cycle, the communication cycle as a whole cannot be shortened. The problem such conventional encoders is that it takes time to communicate encoder data.

SUMMARY OF THE INVENTION

With the foregoing problems in view, an object of the present invention is to provide a communication device that can increase the speed of communications, and an encoder that implements this communication device.

An encoder related to the present invention is constituted from a position detector (for example, the light-emitting part 1, rotating disk 2 and light-receiving part 3 in the embodiment), which detects a signal corresponding to the position of a specimen, and calculates the position of the specimen, and a communication device for transmitting information on the position to a host machine, which is connected via a communication line (for example, the signal processing part 5 in the embodiment). Then, the communication device is constituted having a two-way communication mode, which, when command data is received from a host machine, and this command data is a two-way communication request command, transmits the position information requested by this command to the host machine; a one-way communication mode, which, when command data received in the two-way communication mode is a one-way communication request command, executes one-way transmission processing for transmitting position information to the host machine at a prescribed communication cycle; and a quasi one-way communication mode, which, when command data received in the two-way communication mode is a quasi one-way communication request command, executes quasi one-way transmission processing for transmitting position information to the host machine for only a prescribed number of transmissions at a prescribed communication cycle, and thereafter, waiting only a prescribed time to receive command data, and when command data is received, transitioning to the two-way communication mode, and when command data is not received, repeating quasi one-way transmission processing.

Further, it is desirable that an encoder related to the present invention be constituted such that either a one-way communication request command or a quasi one-way communication request command have a parameter for setting the length of a communication cycle, and execute either one-way transmission processing or quasi one-way transmission processing in accordance with the communication cycle set by this parameter. It is desirable to have a nonvolatile memory, and to store the communication cycle set in the one-way communication request command or quasi one-way communication request command in this nonvolatile memory at this time.

Or, it is desirable that an encoder of the present invention be constituted such that a quasi one-way communication request command have a parameter for setting the number of transmissions, and executes quasi one-way transmission processing in accordance with the number of transmissions set by this parameter. It is desirable to have a nonvolatile memory, and to store the number of transmissions set by the quasi one-way communication request command in this nonvolatile memory at this time.

By constituting an encoder of the present invention as described above, it becomes possible to speed up communications.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
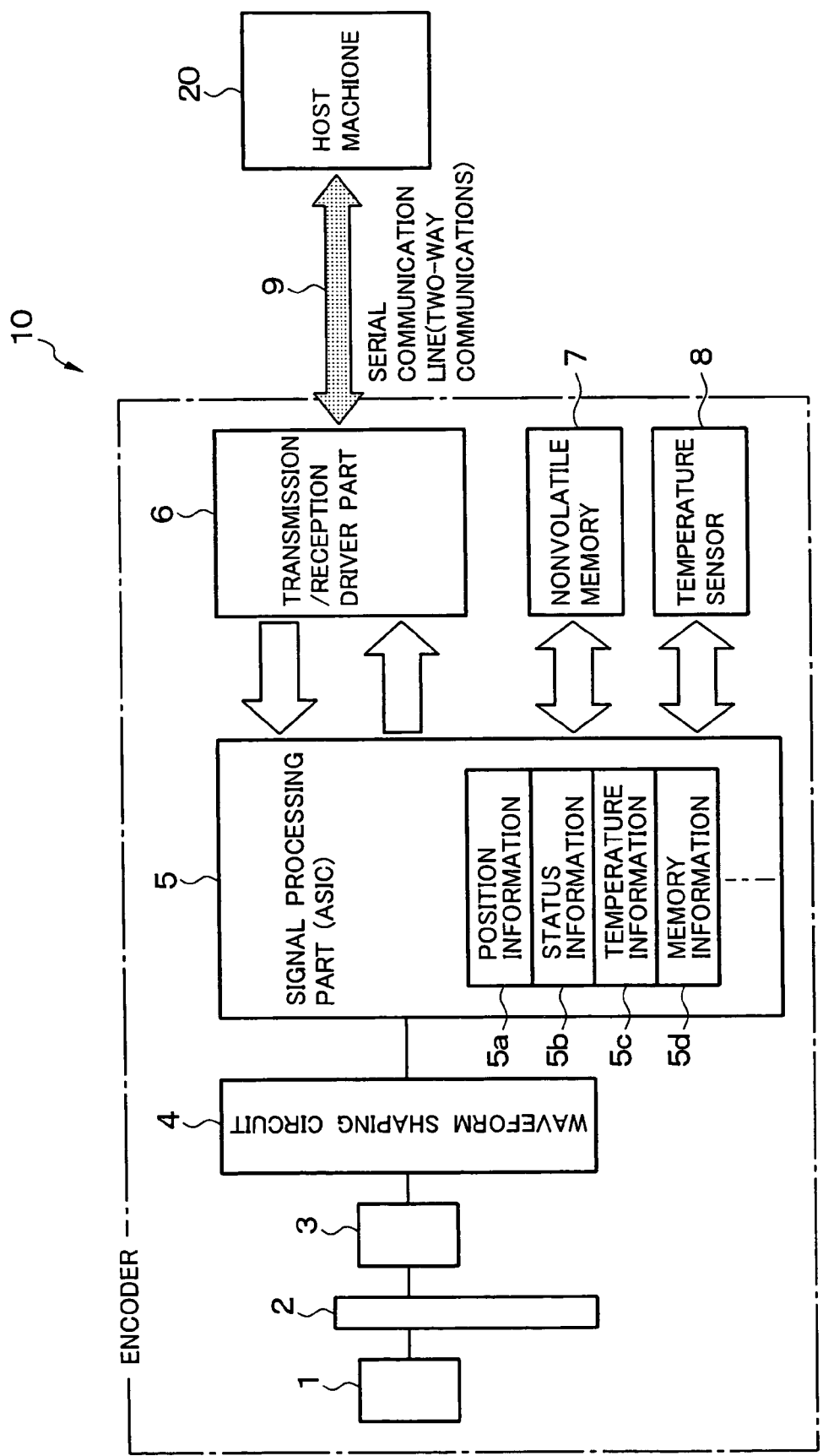
FIG. 1 is a block diagram showing the constitution of an encoder related to the present invention.

The preferred embodiments of the present invention will be explained below by referring to the figures. First, using FIGS. 1 and 2, an absolute encoder for detecting the amount of rotation of an arbitrary rotating body will be explained as an example of an encoder 10, which implements a communication device related to the present invention (the signal processing part 5, which will be explained below).

An encoder 10 is constituted from a light-emitting part 1, a rotating disk 2, a light-receiving part 3, a waveform shaping circuit 4, a signal processing part 5, a transmission/reception driver part 6, a nonvolatile memory 7, and a temperature sensor 8, and is connected to a host machine 20 via a serial communication line 9 connected to the transmission/reception driver part 6.

The light-emitting part 1 and the light-receiving part 3 are arranged facing one another, and the rotating disk 2 is arranged therebetween so as to block light emitted from the light-emitting part 1 to the light-receiving part 3. A tiny slit is formed circumferentially in this rotating disk 2, and the axis of rotation is connected to a specimen (not shown in the figures) for detecting rotation, and rotates together with this specimen. Thus, either light emitted from the light-emitting part 1 in accordance with the rotation of the rotating disk 2 is blocked by the rotating disk 2, or the amount of light received by the light-receiving part 3 is changed by passing through the slit. This change in the amount of light is detected by the light-receiving part 3, is sent to the signal processing part 5 via the waveform shaping circuit 4, the position (angle), direction of rotation, and number of rotations of the rotating disk 2 (these will be referred to collectively as "position information 5a" in the following explanation) are processed by this signal processing part 5, and stored inside this signal processing part 5. Furthermore, the constitution of the rotating disk 2, and the method of detecting its angle and so forth are disclosed in Japanese Laid-open Patent No. 10-206188.

Further, the signal processing part 5 accesses the nonvolatile memory 7 and temperature sensor 8 as needed, and stores information read out from either this temperature sensor 8 or nonvolatile memory 7 as temperature information 5c and memory information 5d. In addition, this signal processing part 5 detects the abnormalities of various signals (for example, it detects if there is an error in a signal obtained from the light received by the light-receiving part 3), and stores this information as status information 5b. Then, this kind of encoder data 5a through 5d is transmitted by the transmission/reception driver part 6 to the host machine 20 from the signal processing part 5 via the communication line 9.

Figure 2:
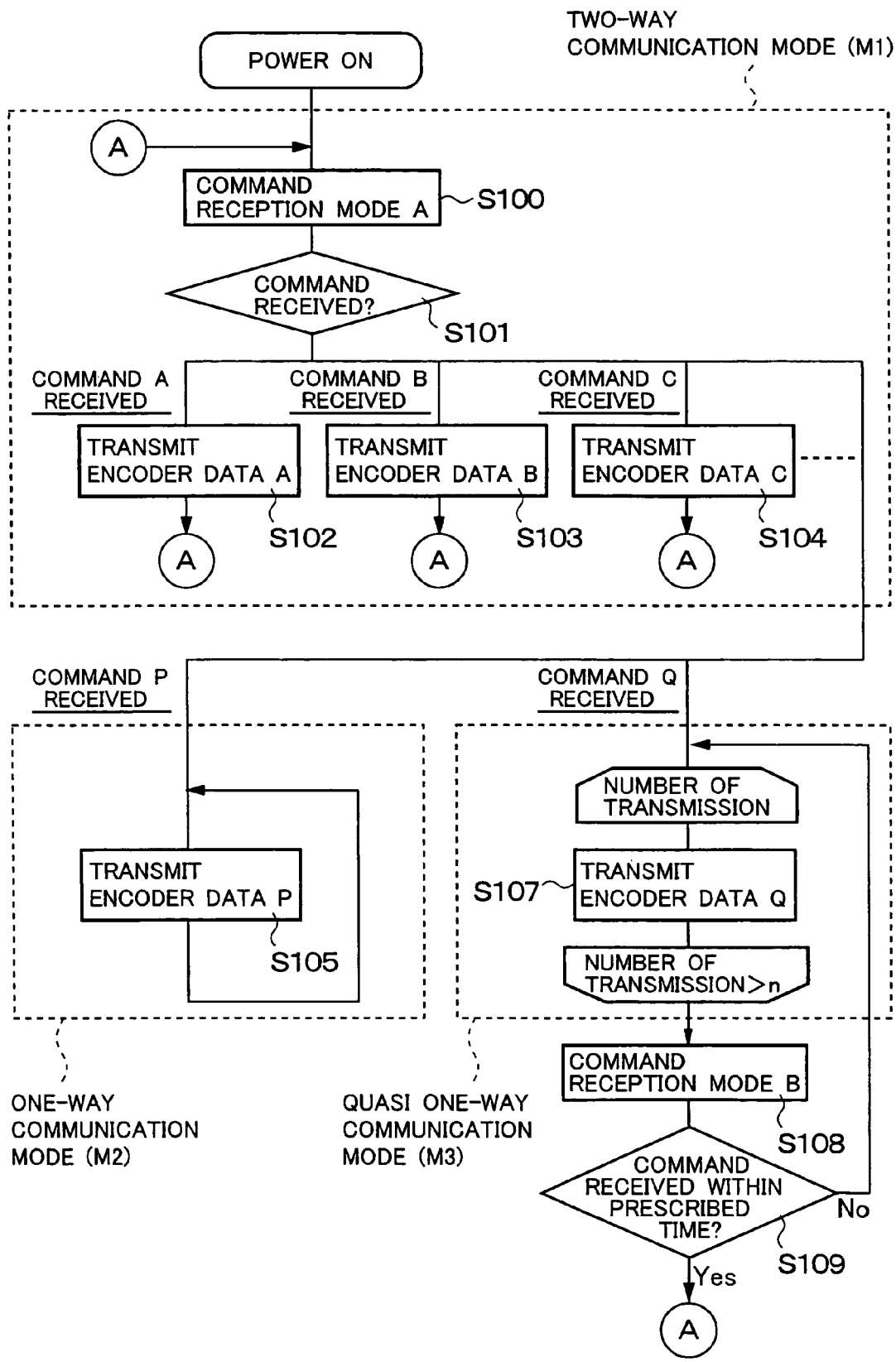
FIG. 2 is a flowchart showing the flow of communication of an encoder related to the present invention.
Figure 3A:
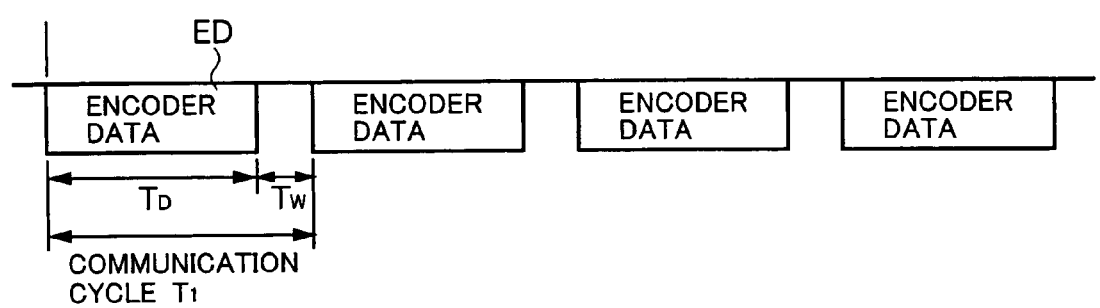
FIG. 3 is a schematic diagram showing the communication cycles of serial communications, with 3A showing one-way serial communication, and 3B showing two-way serial communication.
Figure 3B:
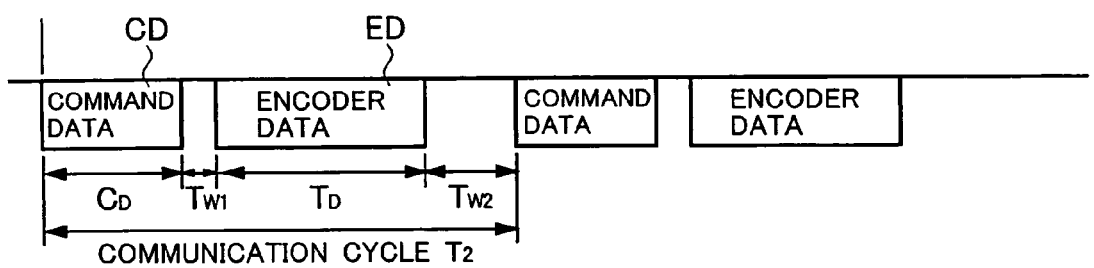

The communication flow when the signal processing part 5 of this encoder 10 transmits the encoder data 5a through 5d to the host machine 20 will be explained using FIG. 2. When the main power supply of the encoder 10 is turned ON, it is in the two-way communication mode M1, and constitutes the command reception mode A, which waits to receive command data from the host machine 20 (Step S100). Here, the two-way communication mode M1, as shown in FIG. 3B, is the mode for receiving command data (a two-way communication request command) CD from the host machine 20, and transmitting encoder data ED in accordance with the type of this command data CD, to the host machine 20. In other words, when the encoder 10 receives command data CD while in the command reception mode A, it checks to determine the command to which this command data CD corresponds, and moves to the corresponding processing (Step S101). In the communication flow of FIG. 2, when the command data is command A, the encoder 10 transmits encoder data A (for example, position information 5a) (Step S102), when the command data is command B, it transmits encoder data B (for example, status information 5b) (Step S103), and when the command data is command C, it transmits encoder data C (for example, temperature information 5c) (Step S104). Then, after transmitting encoder data A through C, which correspond to command A through C, the encoder 10 returns to the command reception mode A (S100), and the two-way communications mode M1 continues.

However, when a command P (one-way communication request command) is sent from the host machine 20 in this command reception mode A (S100), the encoder 10 transitions to the one-way communication mode M2 (Step S101), and one-way transmission processing (processing for transmitting encoder data P) is executed (Step S105). This one-way communication mode M2 is the mode for continuously transmitting only prescribed data (for example, position information 5a and status information 5b) as encoder data P to the host machine 20 at a prescribed communication cycle $T_1$ (FIG. 3A). In the encoder 10 of this embodiment, upon transitioning to this one-way communication mode M2, it is not possible to get out of this mode without turning OFF the power supply.

Conversely, when a command Q (quasi one-way communication request command) is sent from the host machine 20 in command reception mode A (S100), the encoder 10 transitions to a quasi one-way communication mode M3 (Step S101). In the quasi one-way communication mode M3, the encoder 10 executes quasi one-way transmission processing for consecutively carrying out the one-way transmission of encoder data Q only a prescribed number of times (n times) (Step S107). At this time, only prescribed data of the encoder data Q is transmitted to the host machine 20 at a prescribed communication cycle $T_1$. Then, when a prescribed number of transmissions has ended, the encoder 10 transitions to command reception mode B, and waits to receive command data from the host machine 20 (Step S108). In this command reception mode B (S108), the encoder 10 either receives command data from the host machine 20, or transitions to determination processing of the command contents when a timeout occurs after the passage of a prescribed period of time (Step S109). In this determination processing (S109), when a timeout occurs in command reception mode B (S108), the encoder 10 transitions to the above-mentioned quasi one-way transmission processing (S107), and when a prescribed command is received from the host machine 20, it transitions to the two-way communication mode M1, that is, it transitions to command reception mode A (S100).

Furthermore, in quasi one-way transmission processing (S107), the encoder 10 sets a flag in the encoder data Q of immediately prior to transitioning to command reception mode B (encoder data Q to be transmitted for the nth time) indicating the transition to command reception mode B. That is, when a prescribed bit of this encoder data transitions to command reception mode B, the encoder 10 sets a "1"; otherwise it sets a "0". This enables the host machine 20 to determine when the encoder 10 will transition to command reception mode B by looking at this bit.

Thus, by providing the encoder 10 with a quasi one-way communication mode M3, it is possible to adopt a one-way communication format, shorten the communication cycle as much as possible, and increase the quantity of samples taken of the state of a specimen (shorten the sampling interval). Further, at the same time, it becomes possible to return to the two-way communication format (two-way communication mode M1) as needed to enable commands to be received at prescribed intervals, and to acquire from this encoder 10 the required encoder data. Further, it is also possible to switch to the quasi one-way communication mode M3 by transmitting command Q once again.

The two-way communication mode M1 is normally used at system startup and in self-diagnostics, and the host machine 20 can receive encoder data other than position information. The communication cycle can be shortened as much as possible by making the constitution such that only encoder data P and Q described hereinabove, for example, the prescribed data (position information 5a and status information 5b) required for robot control, is transmitted in either the one-way communication mode M2 or the quasi one-way communication mode M3, thus making it possible to operate this robot at high-speed.

Furthermore, by providing in the command data sent from the host machine 20 a parameter for setting a communication cycle time (for example, $T_1$ in FIG. 3) in the one-way communication mode M2 and the quasi on-way communication mode M3, it is possible to arbitrarily change the communication cycle from the host machine 20. Furthermore, this communication cycle can be changed even when the system is being operated. Further, by providing a parameter in the command data for setting the number of repetitions (n) in the quasi one-way communication mode M3, the host machine 20 is capable of setting how many times encoder data can be consecutively transmitted, and can change the communication timing during a quasi one-way communication. The constitution can also be such that this setting information (parameter values) is stored in nonvolatile memory 7, and at startup the signal processing part 5 reads in this information, and sets the communication cycle and number of repetitions. Furthermore, these parameters can also be set by using a command for directly accessing nonvolatile memory 7.

As explained hereinabove, since this encoder 10 can be transitioned from a two-way communication mode M1 to either a one-way communication mode M2 or a quasi one-way communication mode M3, the communication cycle time can be shortened, and wasted communication time eliminated, thereby enabling efficient exchanges of data between the host machine 20 and the encoder 10. Furthermore, in the above explanation, an absolute encoder for measuring the angle of rotation and so forth of a specimen was given as an example in the explanation, but the present invention is not limited to this embodiment, and can also be used in a linear encoder, as well as in another measurement device for transmitting measurement data to a host machine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2005-226163 filed on Aug. 4, 2005, which is incorporated herein by reference.

What is claimed is:

1. An encoder, comprising:
   a position detection part for detecting a signal corresponding to a position of a specimen and for calculating said position of said specimen; and
   a communication device for transmitting information on said position to a host machine connected via a communication line,
   said communication device having:
   a two-way communication mode for receiving command data from said host machine, and, when said command data is a two-way communication request command, transmitting said position information requested by said command data to said host machine;
   a one-way communication mode for executing one-way transmission processing for transmitting said position information to said host machine at a prescribed communication cycle, when said command data received in said two-way communication mode is a one-way communication request command; and
   a quasi one-way communication mode for executing quasi one-way transmission processing for transmitting said position information to said host machine for only a prescribed number of transmissions at a prescribed communication cycle when said command data received in said two-way communication mode is a quasi one-way communication request command, and thereafter, waiting only a prescribed time to receive said command data, and transitioning to said two-way communication mode when said command data is received, and repeating said quasi one-way transmission processing when said command data is not received.

2. The encoder according to claim 1, wherein either said one-way communication request command or said quasi one-way communication request command has a parameter for setting a length of said communication cycle, and
   either one-way transmission processing or quasi one-way transmission processing is executed in accordance with said communication cycle set by said parameter.

3. The encoder according to claim 2, comprising a nonvolatile memory,
   wherein said communication cycle set by said one-way communication request command or said quasi one-way communication request command is stored in said nonvolatile memory.

4. The encoder according to claim 1, wherein said quasi one-way communication request command has a parameter for setting said number of transmissions, and
   said quasi one-way transmission processing is executed in accordance with said number of transmissions set by said parameter.

5. The encoder according to claim 4, comprising a nonvolatile memory,
   wherein said number of transmissions set by said quasi one-way communication request command is stored in said nonvolatile memory.

* * * * *